US008144054B2

(12) United States Patent
Geswender et al.

(10) Patent No.: US 8,144,054 B2
(45) Date of Patent: Mar. 27, 2012

(54) SATELLITE RECEIVER AND METHOD FOR NAVIGATION USING MERGED SATELLITE SYSTEM SIGNALS

(75) Inventors: Chris E. Geswender, Green Valley, AZ (US); Jay A. Stern, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 370 days.

(21) Appl. No.: 12/469,205

(22) Filed: May 20, 2009

(65) Prior Publication Data

US 2012/0038512 A1    Feb. 16, 2012

Related U.S. Application Data

(60) Provisional application No. 61/054,783, filed on May 20, 2008.

(51) Int. Cl.
  G01S 19/21    (2010.01)
  G01S 19/33    (2010.01)
(52) U.S. Cl. .............................. 342/357.59; 342/357.73
(58) Field of Classification Search ............. 342/357.59, 342/357.73, 357.61, 357.56
See application file for complete search history.

(56) References Cited

U.S. PATENT DOCUMENTS

| | | | |
|---|---|---|---|
| 5,594,454 A * | 1/1997 | Devereux et al. ...... | 342/357.395 |
| 5,923,287 A * | 7/1999 | Lennen .................... | 342/357.73 |
| 6,363,123 B1 * | 3/2002 | Balodis .................... | 342/357.62 |
| 6,639,541 B1 * | 10/2003 | Quintana et al. ......... | 342/357.31 |
| 2002/0012411 A1 | 1/2002 | Heinzl et al. | |
| 2004/0257275 A1 * | 12/2004 | Yee et al. ................. | 342/357.02 |
| 2006/0140254 A1 * | 6/2006 | Pietila et al. ............ | 375/147 |
| 2007/0112479 A1 | 5/2007 | Wright et al. | |
| 2007/0274374 A1 | 11/2007 | Abraham | |
| 2008/0037687 A1 * | 2/2008 | Li et al. .................... | 375/316 |
| 2008/0211718 A1 * | 9/2008 | Martin et al. ............ | 342/357.06 |
| 2008/0240315 A1 * | 10/2008 | De Mey et al. .......... | 375/350 |

FOREIGN PATENT DOCUMENTS

WO    WO-2009142729 A1    11/2009

OTHER PUBLICATIONS

R.T. Ioannides et al., Coherent integration of future GNSS signals, Proceedings of the Institute of Navigation—19th International Technical Meeting of the Satellite Division, ION GNSS 06, p. 1253-1268, 2006.*
"International Application Serial No. PCT/US2009/03107, Search Report mailed Jul. 13, 2009", 2 pgs.
"International Application Serial No. PCT/US2009/03107, Written Opinion mailed Jul. 13, 2009", 8 pgs.

* cited by examiner

*Primary Examiner* — Thomas Tarcza
*Assistant Examiner* — Fred H Mull
(74) *Attorney, Agent, or Firm* — Schwegman, Lundberg & Woessner, P.A.; Gregory J. Gorrie

(57) ABSTRACT

Embodiments of a global navigation satellite system (GNSS) receiver and method for navigation are generally described herein. In some embodiments, the GNSS receiver includes signal processing circuitry to systematically identify clear channels from channels with persistent interference by performing two or more signal measurements within each of a plurality of channel bands. The channel bands include at least channel bands of at least two or more different global positioning satellite systems such as GPS satellites, GALILEO system satellites or GLONASS system satellites. In some embodiments, the GNSS receiver provides for self-adapting jamming avoidance in satellite navigation systems.

16 Claims, 5 Drawing Sheets

SATELLITE RECEIVER AND METHOD FOR NAVIGATION USING MERGED SATELLITE SYSTEM SIGNALS

CROSS-REFERENCES TO RELATED APPLICATIONS

This application claims the benefit of U.S. Provisional Patent Application No. 61/054,783, filed May 20, 2008 which is incorporated herein by reference.

TECHNICAL FIELD

Embodiments pertain to guidance systems and methods for navigation using multiple satellite system signals. Some embodiments apply to satellite signal receivers. Some embodiments pertain to self-adapting jamming avoidance in satellite navigation systems.

BACKGROUND

Global navigation satellite systems (GNSS) allow positions to be accurately determined for many places on Earth. In the future, the number of satellites available from which to take a position may more than double with the ability to access signals from satellites in the United States global positioning system (GPS), the Russian global positioning system (GLONASS) and the European Union global positioning system (GALILEO). These additional satellite navigation systems may allow positions to be accurately determined even in locations where buildings or mountains obscure signals from satellites that are low on the horizon. However, each of these satellite navigation systems operates according to different specifications making it difficult to navigate using more than one satellite navigation system. For example, the satellites of these various systems may operate at different altitudes and in different frequency ranges, some of which may overlap.

Another difficulty with navigating using a satellite navigation system is jamming Jamming may be a deliberate act to deny navigation, although an inadvertent frequency overlap may have the same effect. Current solutions focus on explicit anti jamming hardware and multiple bands within the positioning system in an attempt to actively suppress jammed signals electronically. These solutions, however, do not always result in the ability to properly navigate.

Thus, there are general needs for satellite navigation receivers configured to receive and process signals from more than one satellite navigation system. There are also general needs for satellite navigation receivers configured to navigate using more than one satellite navigation system and avoid the effects of jamming. There are general needs for satellite navigation receivers configured to receive signals from GPS, GALILEO, and GLONASS satellites.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Figure 1:
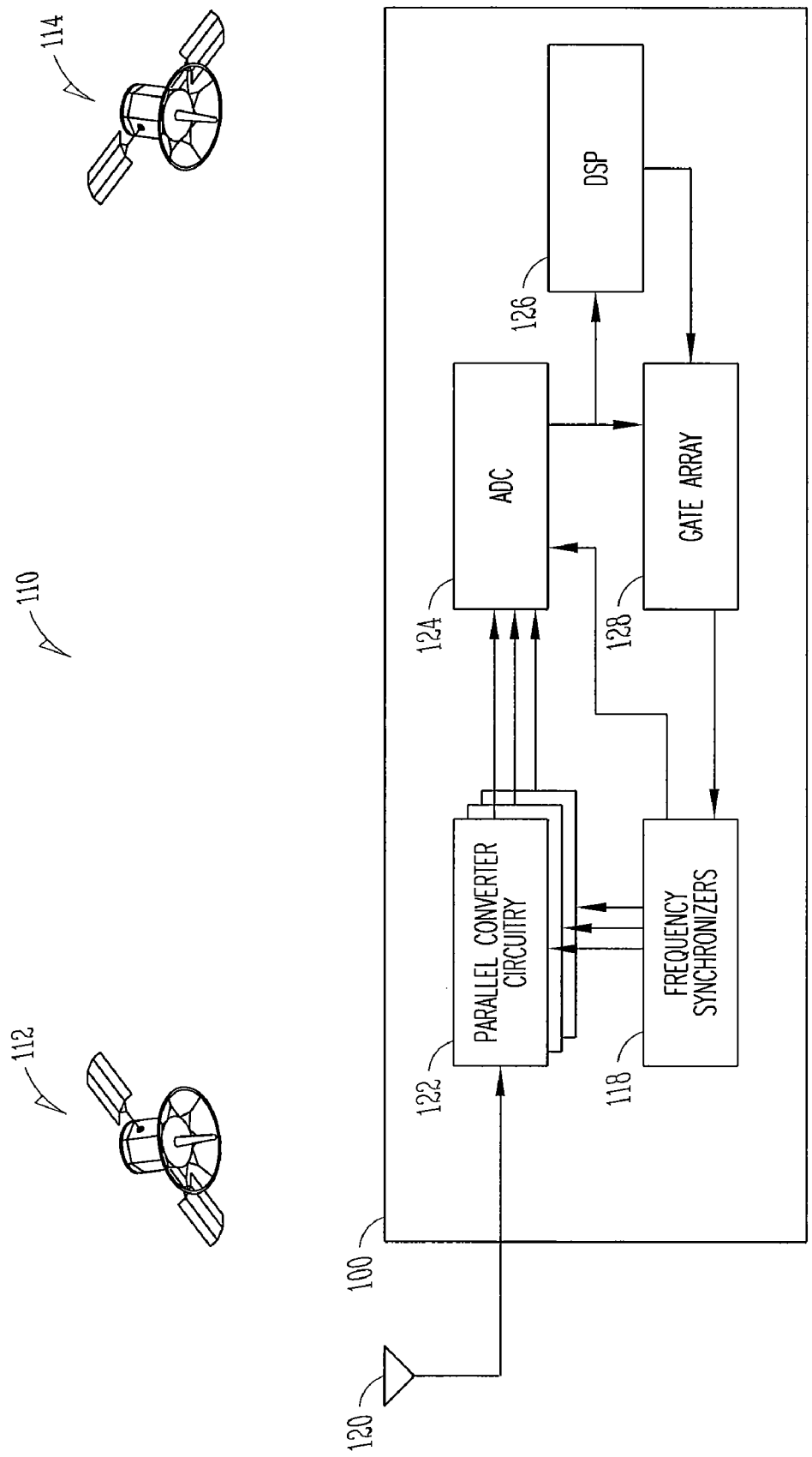
FIG. 1 illustrates of a global navigation satellite system and a global navigation satellite system receiver in accordance with some embodiments.

FIG. 1 illustrates of a global navigation satellite system and a global navigation satellite system receiver in accordance with some embodiments. Global navigation satellite system 110 includes sets of satellites from multiple navigation satellite systems. A first set of satellites 112 may be associated with a first global navigation satellite system, and a second set of satellites 114 may be associated with a second global navigation satellite system. Global navigation satellite system 110 may include other sets of satellites (not separately illustrated) associated with other global navigation satellite systems. The various global navigation satellite systems may be any two or more different systems. For example, the systems may include the United States GPS system, the Russian GLONASS system, and/or the European GALILEO system, although the scope of the embodiments is not limited in this respect.

Global navigation satellite system receiver 100 may be configured to receive and process signals from two of more of the two or more global navigation satellite systems 110. Each of the global navigation satellite systems 110 may transmit within multiple channel bands. Table I shows the channel bands associated GPS, GALILEO and GLONASS system satellites. Table I also show the associated center frequencies in Megahertz (MHz) and the particular satellite navigation system that utilizes the signal. GPS satellites currently use the L1 and L2 bands. GALILEO satellites use the L1, E1, E2, E5 and E6 bands. GLONASS satellites use L1 and L2 bands. The bands may overlap between systems, the bandwidth may vary from system to system and the service may be open and/or encrypted.

TABLE I

| Channel Band Designation | Channel Center Frequency (MHz) | System |
| --- | --- | --- |
| L1 | 1575.420 | GPS |
| L2 | 1227.600 | GPS |
| L5 | 1176.450 | GPS |
| L1 | 1575.420 | GALILEO |
| E1 L1 E2 | 1575.420 | GALILEO |
| E5a | 1176.450 | GALILEO |
| E5b | 1207.140 | GALILEO |
| E6 | 1278.750 | GALILEO |
| E5ab | 1191.795 | GALILEO |
| L1 | 1603.41 | GLONASS |
| L2 | 1247.09 | GLONASS |

Each of the satellites in the global navigation satellite systems 110 may travel in a predictable orbit above the Earth's surface and each satellite may transmit a signal with a time-based reference associated therewith. Global navigation satellite system receiver 100 may be configured to detect and process signals from at least two of the global navigation satellite systems 110. Receiver 100 may include a signal detector to detect the transmission from a particular satellite by determining the degree of correlation between the received signal and a main time clock on the receiver. If a correlation value for one of the transmissions is detected, the receiver 100 has detected the transmission from the satellite. The receiver 100 may be a self-contained receiver device, or it may be a module included in another device, such as a GPS module in a wireless communication device. In some embodiments, receiver 100 may be included within an aircraft, watercraft, landcraft or missile for navigation.

In accordance with embodiments, global navigation satellite system receiver 100 may include parallel converter circuitry 122 to channelize and convert each of a plurality of satellite signal transmissions to an intermediate frequency. The global navigation satellite system receiver 100 may also include analog-to-digital converter (ADC) circuitry 124 to convert each of the intermediate frequencies to a digital signal, and digital signal processing (DSP) circuitry 126 to determine interference in the digital signal and identify clear channels. The global navigation satellite system receiver 100 may also include a gate array 128 to accept transmission signals through clear channels, and frequency synchronizers 118 for synchronizing transmissions through clear channels for global positioning and/or navigation. The global navigation satellite system receiver 100 may also be configured to be coupled with one or more antennas 120 which may be external to the receiver 100. Each of the antennas 120 may be tuned to a specific signal frequency and bandwidth, although this is not a requirement. In some embodiments the antennas 120 may be configured to receive frequencies of the various channel bands illustrated in Table I. In alternate embodiments, the one or more antennas 120 may comprise a broadband passive antenna.

In some embodiments, each signal path in parallel converter circuitry 122 may be associated with a channel band and may have a radio frequency (RF) to intermediate frequency (IF) converter. Each RF to IF converter may be configured according to a particular channel band. The IF signals for each signal path may be converted from analog to digital in ADC circuitry 124. The frequency synchronizers 118 may provide a local oscillator signal to the RF to IF converters of parallel converter circuitry 122 and to the ADC circuitry 124.

DSP circuitry 126 may process the digital signals for detection of interference in the received signals. Interference may include, for example, interference intentionally caused for jamming purposes. The processed signals may have an intensity (I), a pseudo-range (PR), and a delta range (DR) associated therewith. The intensity is related to the signal strength. The pseudo-range and delta-range portions of the processed signals may be used for position determination and/or navigation. From the processed signals, a determination may be made as to the level of interference in a channel. The gate array 128 is configured to accept the signals that do not exhibit interference (i.e., clear channel signals) for use by the global navigation satellite system receiver 100 for navigation and location determination. In some embodiments, gate array 128 may be a channel noise Field Programmable Gate Array (FPGA), although this is not a requirement.

In accordance with embodiments, global navigation satellite system receiver 100 is configured to perform frequency selection based on minimum signal disturbance. The best available channels may be identified within the available channel bands for use rather than attempting to suppress jamming signal activity by electronic means. The best available channels may be provided by any one or more of the available satellite system (e.g., GPS, GALILEO, GLONASS, or other GNSS). In some embodiments, DSP circuitry 126 may be configured to identify another clear channel when jamming or persistent interference is detected on a channel previously identified as a clear channel.

Although global navigation satellite system receiver 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of receiver 100 may refer to one or more processes operating on one or more processing elements.

Figure 2A:
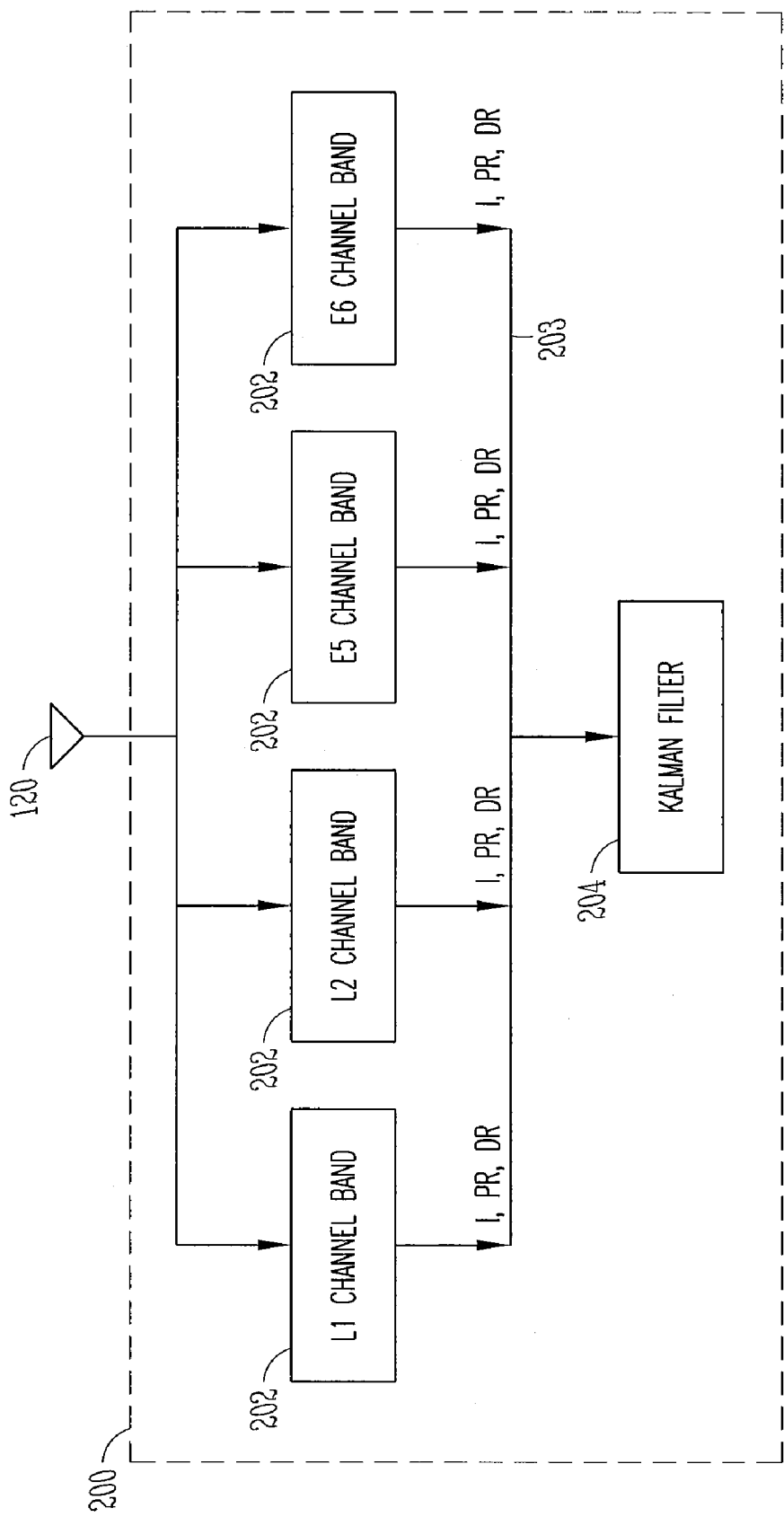
FIG. 2A illustrates a multi-channel satellite system receiver in accordance with some embodiments.

FIG. 2A illustrates a multi-channel satellite system receiver in accordance with some embodiments. As illustrated in FIG. 2A, multi-channel satellite system receiver 200 includes channel processing circuitry 202 for different satellite system channel bands. Each channel processing circuitry 202 may generate a processed signal having an intensity (I), a pseudo-range (PR), and a delta range (DR) associated therewith. Channel processing circuitry 202 may be suitable for use as parallel converter circuitry 122 (FIG. 1), ADC circuitry 124 (FIG. 1) and DSP 126 (FIG. 1). Multi-channel satellite system receiver 200 also includes Kalman filter 204 to operate on the processed signals provided by channel processing circuitry 202. The operations of the Kalman filter 204 may be performed by DSP 126. The output from the Kalman filter 204 may be provided to gate array 128.

Figure 2B:
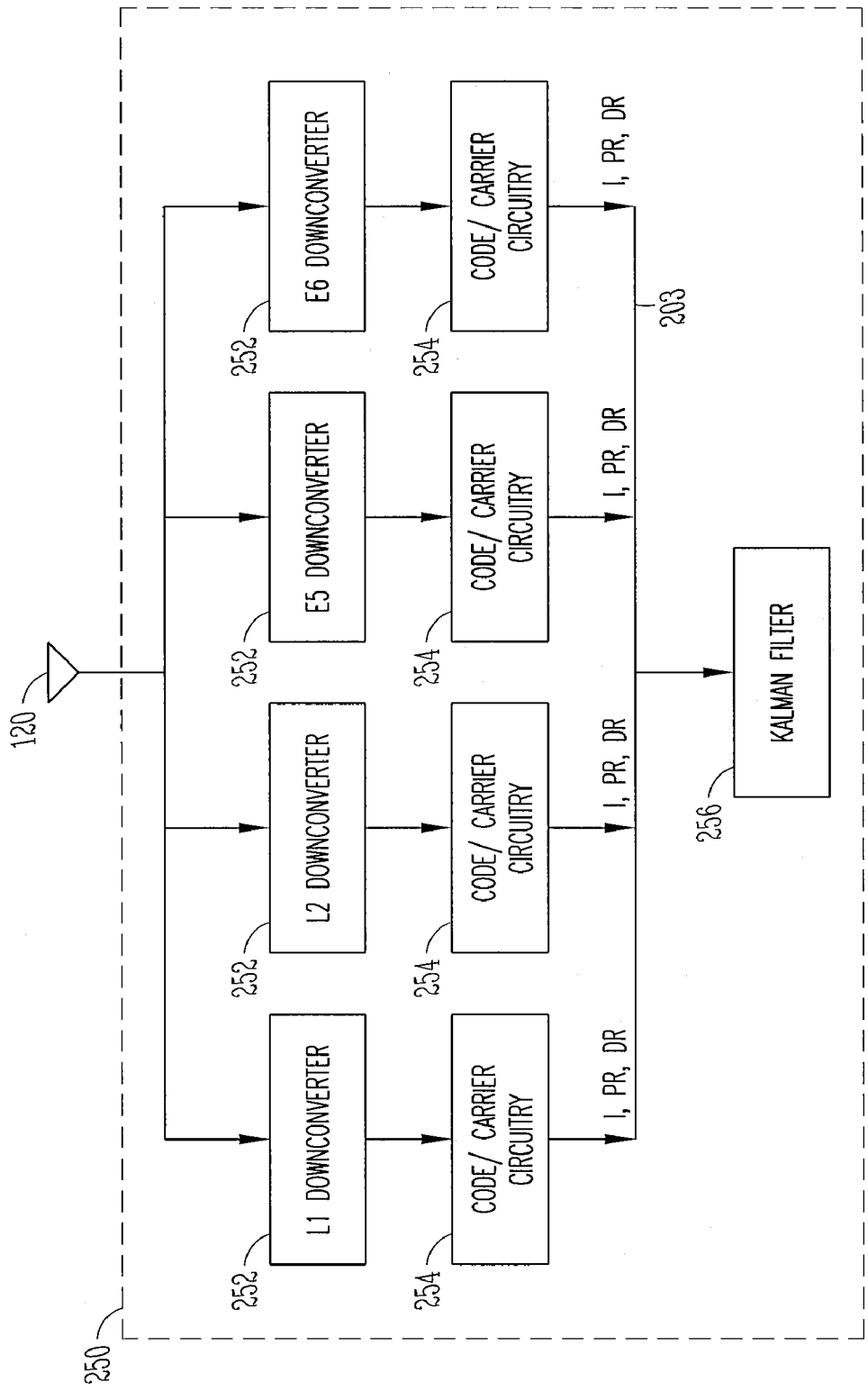
FIG. 2B illustrates a multi-channel satellite system receiver in accordance with some alternate embodiments.

FIG. 2B illustrates a multi-channel satellite system receiver in accordance with some alternate embodiments. As illustrated in FIG. 2B, multi-channel satellite system receiver 250 includes downconverter circuitry 252 and code/carrier circuitry 254 for different satellite system channel bands. Each of downconverter circuitry 252 and code/carrier circuitry 254 may generate processed signals having an intensity (I), a pseudo-range (PR), and a delta range (DR) associated therewith. Downconverter circuitry 252 may be suitable for use as parallel converter circuitry 122, and code/carrier circuitry 254 may be suitable for use as ADC circuitry 124 and DSP 126. Multi-channel satellite system receiver 250 also includes Kalman filter 256 to operate on the processed signals provided by the code/carrier circuitries 254. The operations of the Kalman filter 256 may be performed by DSP 126. The output from the Kalman filter 256 may be provided to gate array 128.

Although multi-channel satellite system receivers 200 and 250 (FIGS. 2A and 2B) show circuitry for processing only four channel bands (i.e., channel bands L1, L2, E5 and E6), circuitry for processing additional channel bands may also be included. In some alternate embodiments, multi-channel satellite system receivers 200 and 250 (FIGS. 2A and 2B) may include circuitry for processing only three channel bands, although the scope of this disclosure is not limited in this respect.

Figure 3:
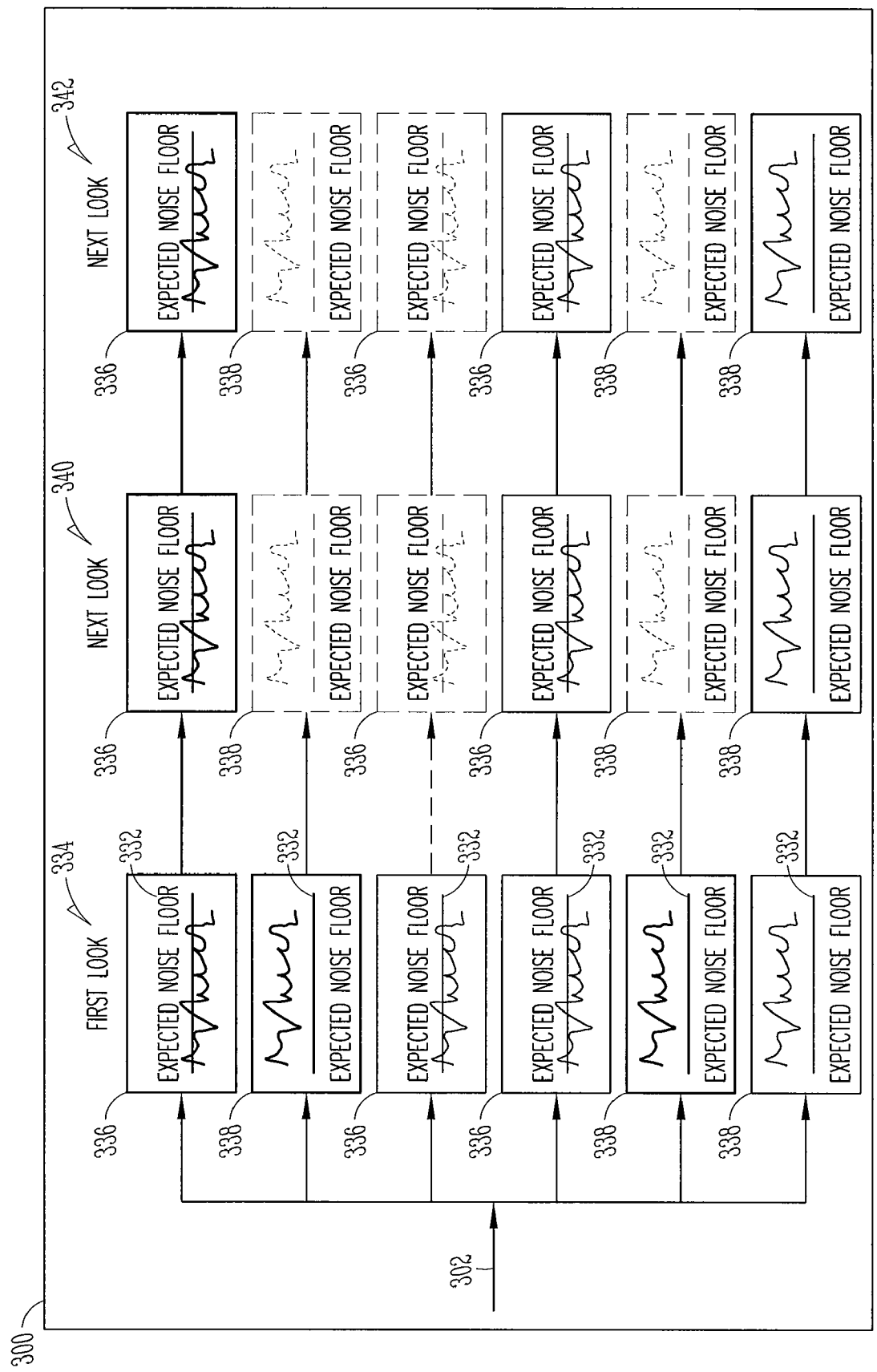
FIG. 3 illustrates a procedure for searching for clear channels in accordance with some embodiments.

FIG. 3 illustrates a procedure 300 for searching for clear channels in accordance with some embodiments. Procedure 300 may be performed by DSP 126 (FIG. 1) to distinguish clear channel signals from signals with excessive noise and interference. Noise may have several sources and procedure 300 is configured to identify channels that are clear from persistent interference, which may be jamming signals. A certain amount of noise in the signal is expected and is shown as expected noise floor threshold 332.

In accordance with embodiments, the received signal 302 for a particular channel is compared to the expected noise floor threshold 332. Signals with a noise level above the expected noise floor threshold 332 are considered to be signals with interference, which may be intentional or unintentional interference. A first look 334 is performed and clear channels 336 and channels with interference 338 are initially identified. In these embodiments, procedure 300 searches channels in a channel band for persistent interference, thereby identifying which channels to avoid. In accordance with embodiments, a next look 340 is performed on other channels within the channel band to identify the clear channels 336 and channels with interference 338. In some embodiments, a third look 342 at yet another channel within the channel band may also be performed. More or fewer looks may be made than that which is shown in FIG. 3 without departing from the scope of the embodiments. Each look may be performed on a different channel within the same channel band.

Channels with signal levels that are greater than the expected noise floor threshold 332 by a predetermined amount may be identified to be channels with interference 338. Channels with signal levels that are not greater than the expected noise floor threshold 332 by the predetermined amount may be identified as clear channels 336.

Figure 4:
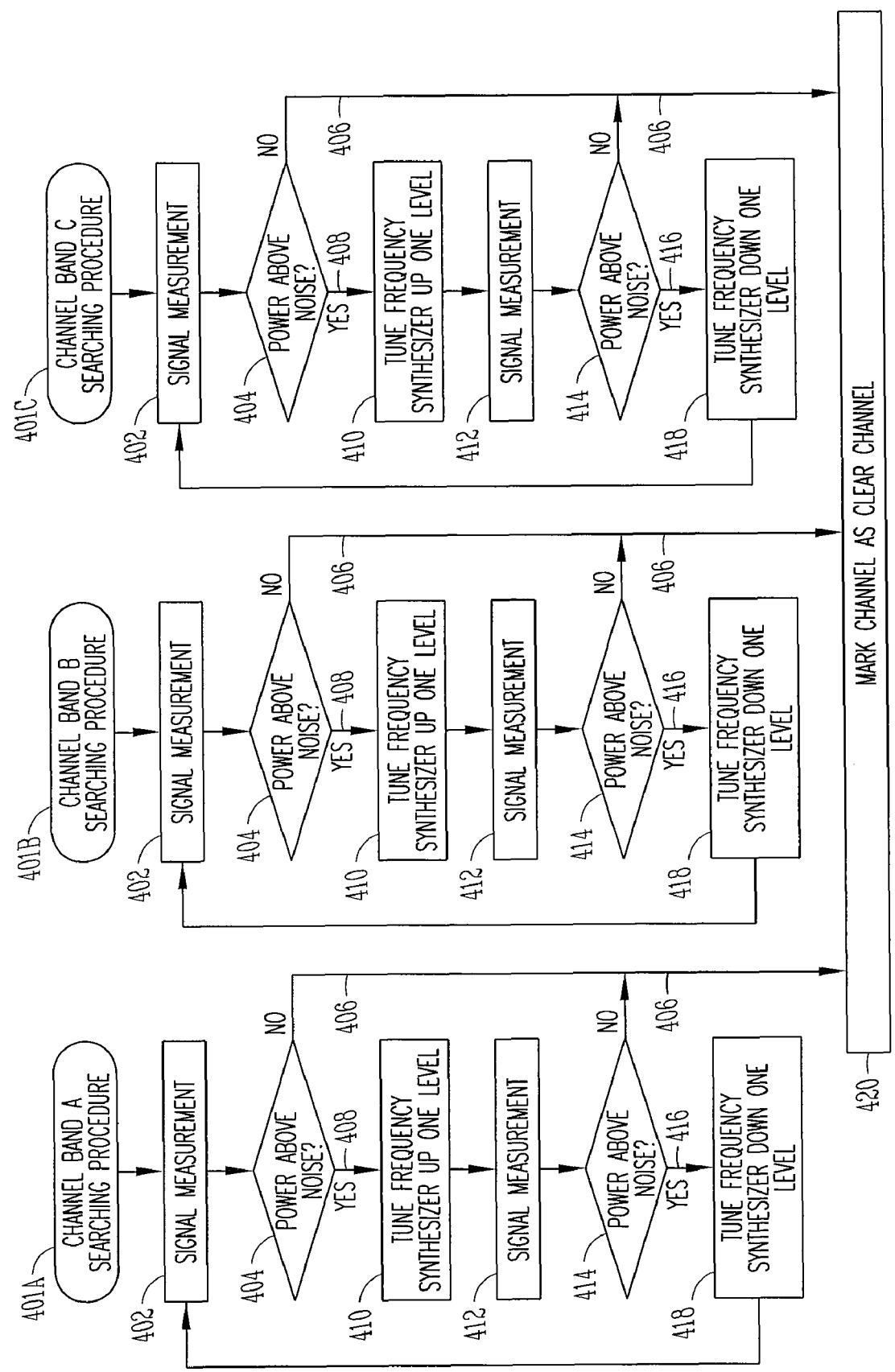
FIG. 4 is a flow chart of a channel searching procedure in accordance with some embodiments.

FIG. 4 is a flow chart of a channel searching procedure in accordance with some embodiments. Channel searching procedure is configured to perform a search concurrently on at least three channel bands and includes channel band A searching procedure 401A, channel band B searching procedure 401B, and channel band C searching procedure 401C to identify clear channels 336 (FIG. 3) from channels with interference 338 (FIG. 3) within each of the channel bands. A channel band may be associated with a frequency range and a plurality of channels may be included within the channel band. Examples of the channel bands are shown in TABLE I (discussed above). Channel searching procedures 401A, 401B and 401C may be performed by some of the elements of global navigation satellite system receiver 100 (FIG. 1), including multi-channel satellite system receivers 200 and 250 (FIGS. 2A and 2B).

In operations 402, after tuning one of the frequency synchronizers 118 (FIG. 1) to a particular channel in a channel band, the channel is measured and the presence of interference is determined. In some embodiments, a power measurement may be used to determine the presence of interference although other techniques to detect the presence of interference may be used. For example, the interference may be detected through the use of time and frequency domain techniques. In operations 404, a comparison is made between the measured signal and the expected noise floor threshold 332 (FIG. 3). When the measured signal is within the expected noise level, path 406 is taken. The channel is identified and marked as a clear channel in operation 420 and further processed by DSP 126 (FIG. 1) to determine the intensity (I), the pseudo-range (PR), and the delta range (DR) associated therewith.

When the measured signal in operation 402 is above the expected noise floor threshold 332, path 408 is taken and operations 410 are performed. In operations 410, the frequency synthesizer 118 is tuned to another channel 110 within the channel band (e.g., one level up from the current channel) and the channel is measured and the presence of interference is determined in operations 412. In operations 414, a comparison is made between the measured signal and the expected noise floor threshold 332. When the measured signal is within the expected noise level, path 406 is taken and the channel is identified and marked as a clear channel in operations 420 and further processed by DSP 126. When the measured signal in operations 412 is above the expected noise floor threshold 332, path 416 is taken and operations 418 are performed. In operations 418, the frequency synthesizer 118 is tuned to another channel within the channel band (e.g., tuned down one level in the channel band). The operations of procedures 401A-401C may be repeated to measure other channels in each channel band to identify clear channels.

Procedures 401A-401C are configured to eliminate channels with persistent interference in a particular channel band working under the assumption that not all channels in a particular channel band will be intentionally jammed. When the interference is not persistent, the channel may be identified as a clear channel for use in location determination and/or navigation. When the interference is persistent, the channel may be being jammed and is not used. In this way, a receiver, such as global navigation satellite system receiver 100 (FIG. 1), may identify clear channels available from multiple satellite systems and may use almost any available navigation satellite regardless of the particular system (e.g., GPS, GALILEO, GLONASS or otherwise). In this way, not only can navigation be performed when some channels are being jammed, navigation can be performed in the event of a loss of one of the channels due to position of the receiver or due to interference.

For example, channel band A may be the L1 channel band, channel band B may be the L2 channel band, and channel band C may be the E5 or E6 channel band. When channel band A is the L1 channel band, the different channels associated with different satellite systems (GPS, GALILEO and/or GLONASS) within the L1 channel band may be measured and identified as either a clear channel or a channel with persistent interference. When channel band B is the L2 channel band, the different channels associated with different satellite systems (GPS GALILEO and/or GLONASS) within the L2 channel band may be measured and identified as either a clear channel or a channel with persistent interference. When channel band C is the E5 channel band, the different channels associated with the GALILEO system within the E5 channel band may be measured and identified as either a clear channel or a channel with persistent interference.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A global navigation satellite system (GNSS) receiver comprising:

signal processing circuitry to identify clear channels from channels with persistent interference by performing two or more signal measurements within each of a plurality of channel bands; and gate array circuitry to operate on the channels that are identified as clear channels for navigation and to refrain from operating on the channels that are identified as having persistent interference for navigation, wherein for each of the channel bands, the signal processing circuitry is configured to perform two or more signal measurements within each of the channel bands to:

identify channels having a signal level above a noise floor threshold by at least a predetermined amount as a channel with persistent interference; and identify channels having a signal level at or near the noise floor threshold as a clear channel,
wherein the channel bands include channel bands of two or more different global positioning satellite systems.

2. The GNSS receiver of claim 1 wherein satellites of the two or more different global positioning satellite systems include a United States global positioning system (GPS) satellites, GALILEO system satellites or GLONASS system satellites.

3. The receiver of claim 2 wherein the signal processing circuitry is further configured to identify another clear channel when jamming in the form of persistent interference is detected on a channel previously identified as a clear channel.

4. The receiver of claim 3 wherein for each of the channel bands, as part of identifying channels, the signal processing circuitry is configured to:
take a signal measurement that is representative of signal intensity for a first channel in a channel band;
compare the measurement on the first channel to the noise floor threshold;
determine whether signal interference for the first channel is greater than the noise floor threshold;
take a second signal measurement that is representative of signal intensity for a second channel in the channel band;
compare the measurement on the second channel to the noise floor threshold;
determine whether signal interference for the second channel is greater than the noise floor threshold; and
determine whether either the first or second channels in the channel band have persistent signal interference based on the signal measurements.

5. The receiver of claim 4 wherein the signal processing circuitry is configured to refrain from taking additional signal measurement for other channels in the channel band when the first and the second channels are determined to have persistent interference.

6. The receiver of claim 4 wherein for each of the channel bands, as part of identifying channels, the signal processing circuitry is further configured to:
take a third signal measurement that is representative of signal intensity for a third channel in the channel band;
compare the measurement on the third channel to the noise floor threshold;
determine whether signal interference for the third channel is greater than the noise floor threshold; and
determine whether either the first, second or third channels in the channel band have persistent signal interference based on the signal measurements.

7. The receiver of claim 4 wherein the signal measurements comprise either power-level measurements or frequency and time domain measurements.

8. The receiver of claim 2 further comprising parallel converter circuitry to concurrently down-convert a selected channel in each of the channel bands.

9. A method performed by a global navigation satellite system (GNSS) receiver for selecting signals for navigation comprising:

identifying clear channels from channels with persistent interference by performing two or more signal measurements on channels within each of a plurality of channel bands,
operating on the channels that are identified as clear channels for navigation; and
refraining from operating on the channels that are identified as having persistent interference for navigation,
wherein for each of the channel bands, the method includes performing two or more signal measurements within each of the channel bands to:
identify channels having a signal level above a noise floor threshold by at least a predetermined amount as a channel with persistent interference; and
identify channels having a signal level at or near the noise floor threshold as a clear channel,
wherein the channel bands include at least channel bands of two or more different global positioning satellite systems.

10. The method of claim 9 wherein satellites of the two or more different global positioning satellite systems include United States global positioning system (GPS) satellites, GALILEO system satellites or GLONASS system satellites.

11. The method of claim 10 further comprising identifying another clear channel when jamming in the form of persistent interference is detected on a channel previously identified as a clear channel.

12. A receiver system for satellite navigation comprising:
parallel converter circuitry to down-convert signals within each of a plurality of channel bands;
signal processing circuitry to perform two or more signal measurements within each of the channel bands to identify clear channels from channels with persistent interference; and
gate-array circuitry to operate on the channels identified as clear channels and to refrain from operating on channels with persistent interference,
wherein for each of the channel bands, the signal processing circuitry is configured to perform two or more signal measurements within each of the channel bands to:
identify channels having a signal level above a noise floor threshold by at least a predetermined amount as a channel with persistent interference; and
identify channels having a signal level at or near the noise floor threshold as a clear channel,
wherein the channel bands include at least channel bands of two or more different global positioning satellite systems.

13. The system of claim 12 wherein satellites of the two or more different global positioning satellite systems include United States global positioning system (GPS) satellites, GALILEO system satellites or GLONASS system satellites.

14. The system of claim 13 wherein the signal processing circuitry is further configured to identify another clear channel when jamming in the form of persistent interference is detected on a channel previously identified as a clear channel.

15. The system of claim 14, wherein the system is configured for use for aircraft navigation.

16. The system of claim 14, wherein the system is configured for use for missile navigation.

* * * * *

UNITED STATES PATENT AND TRADEMARK OFFICE
CERTIFICATE OF CORRECTION

| | | |
|---|---|---|
| PATENT NO. | : 8,144,054 B2 | Page 1 of 1 |
| APPLICATION NO. | : 12/469205 | |
| DATED | : March 27, 2012 | |
| INVENTOR(S) | : Chris E. Geswender et al. | |

It is certified that error appears in the above-identified patent and that said Letters Patent is hereby corrected as shown below:

ON THE TITLE PAGE:

Item (57), under "Abstract", in column 2, line 8, after "of" delete "at least".

IN THE SPECIFICATIONS:

In column 1, line 40, delete "jamming" and insert -- jamming. --, therefor.

IN THE CLAIMS:

In column 7, lines 10-14, in Claim 3, delete "3. The receiver of claim 2 wherein the signal processing circuitry is further configured to identify another clear channel when jamming in the form of persistent interference is detected on a channel previously identified as a clear channel." and
insert -- 3. The receiver of claim 2 wherein the signal processing circuitry is further configured to identify another clear channel when jamming in the form of persistent interference is detected on a channel previously identified as a clear channel. --, therefor.

Signed and Sealed this
Twenty-sixth Day of June, 2012

David J. Kappos
*Director of the United States Patent and Trademark Office*